(12) United States Patent
Graf et al.

(10) Patent No.: US 6,724,836 B1
(45) Date of Patent: Apr. 20, 2004

(54) DETECTION OF SIGNALS TRANSMITTED BY FREQUENCY-SHIFT KEYING MODULATION TECHNIQUES

(75) Inventors: Joseph T. Graf, Robins, IA (US); James C. Gregory, North Liberty, IA (US)

(73) Assignee: Rockwell Collins, Cedar Rapids, IA (US)

( * ) Notice: Subject to any disclaimer, the term of this patent is extended or adjusted under 35 U.S.C. 154(b) by 686 days.

(21) Appl. No.: 09/660,015

(22) Filed: Sep. 12, 2000

(51) Int. Cl.[7] .............................. H03D 3/00; H04L 27/10
(52) U.S. Cl. ........................................ 375/334; 375/279
(58) Field of Search ................................ 375/334, 324, 375/319, 325, 326, 344; 329/300, 301, 302

(56) References Cited

U.S. PATENT DOCUMENTS

| | | | | |
|---|---|---|---|---|
| 3,846,708 A | * | 11/1974 | Franco | 329/303 |
| 5,420,888 A | * | 5/1995 | Davis et al. | 375/334 |
| 5,497,121 A | * | 3/1996 | D'Hont | 329/302 |
| 5,987,075 A | * | 11/1999 | Abe et al. | 375/334 |

* cited by examiner

Primary Examiner—Khai Tran
(74) Attorney, Agent, or Firm—Nathan O. Jensen; Kyle Eppele

(57) ABSTRACT

An apparatus and method of detecting signals transmitted via frequency-shift keying techniques. An observation window encompassing a frequency band is defined and searched for received tones, the frequency spacing between received tones is calculated and compared to known FSK modulation techniques to determine whether at least part of a transmission is potentially present. The transmission may be an automatic link establishment signal. A histogram can store data on received tones. The observation window can be shifted to center a potential FSK transmission for parallel modem processing that will attempt to demodulate and decode it.

20 Claims, 7 Drawing Sheets

| FREQUENCY, Hz | FFT BIN NUMBERS | DECISION INDEX | CASE 1 | CASE 2 | CASE 3 | CASE 4 | CASE 5 |
|---|---|---|---|---|---|---|---|
| -4000 TO -3781.25 | 0-7 | -16 | 0 | 0 | 0 | 0 | 0 |
| -3750 TO -3531.25 | 8-15 | -15 | 0 | 0 | 0 | 0 | 0 |
| -3500 TO -3281.25 | 16-23 | -14 | 0 | 0 | 0 | 0 | 0 |
| -3250 TO -3031.25 | 24-31 | -13 | 0 | 0 | 0 | 0 | 0 |
| -3000 TO -2781.25 | 32-39 | -12 | 0 | 0 | 0 | 0 | 0 |
| -2750 TO -2531.25 | 40-47 | -11 | 0 | 0 | 0 | 0 | 0 |
| -2500 TO -2281.25 | 48-55 | -10 | 0 | 0 | 0 | 0 | 0 |
| -2250 TO -2031.25 | 56-63 | -9 | 0 | 0 | 0 | 0 | 0 |
| -2000 TO -1781.25 | 64-71 | -8 | 0 | 0 | 0 | 0 | 0 |
| -1750 TO -1531.25 | 72-79 | -7 | 0 | 0 | 0 | 0 | 0 |
| -1500 TO -1281.25 | 80-87 | -6 | 0 | 0 | 0 | 0 | 0 |
| -1250 TO -1031.25 | 88-95 | -5 | 0 | 0 | 0 | 0 | 0 |
| -1000 TO -781.25 | 96-103 | -4 | 0 | 0 | 0 | 0 | 0 |
| -750 TO -531.25 | 104-111 | -3 | 0 | 0 | 0 | 0 | 0 |
| -500 TO -281.25 | 112-119 | -2 | 0 | 0 | 0 | 0 | 0 |
| -250 TO -31.25 | 120-127 | -1 | 0 | 0 | 1 | 0 | 0 |
| 0 TO 218.75 | 128-135 | 0 | 0 | 0 | 1 | 0 | 0 |
| 250 TO 468.75 | 136-143 | 1 | 0 | 0 | 1 | 1 | 0 |
| 500 TO 718.75 | 144-151 | 2 | 0 | 0 | 1 | 1 | 0 |
| 750 TO 968.75 | 152-159 | 3 | 1 | 0 | 1 | 1 | 0 |
| 1000 TO 1218.75 | 160-167 | 4 | 1 | 0 | 1 | 1 | 0 |
| 1250 TO 1468.75 | 168-175 | 5 | 1 | 0 | 1 | 1 | 0 |
| 1500 TO 1718.75 | 176-183 | 6 | 1 | 0 | 1 | 1 | 0 |
| 1750 TO 1968.75 | 184-191 | 7 | 1 | 1 | 0 | 1 | 0 |
| 2000 TO 2218.75 | 192-199 | 8 | 1 | 1 | 0 | 1 | 0 |
| 2250 TO 2468.75 | 200-207 | 9 | 1 | 1 | 0 | 0 | 0 |
| 2500 TO 2718.75 | 208-215 | 10 | 1 | 1 | 0 | 0 | 1 |
| 2750 TO 2968.75 | 216-223 | 11 | 0 | 1 | 0 | 0 | 1 |
| 3000 TO 3218.75 | 224-231 | 12 | 0 | 1 | 0 | 0 | 1 |
| 3250 TO 3468.75 | 232-239 | 13 | 0 | 1 | 0 | 0 | 1 |
| 3500 TO 3718.75 | 240-247 | 14 | 0 | 1 | 0 | 0 | 1 |
| 3750 TO 3968.75 | 248-255 | 15 | 0 | 0 | 0 | 0 | 1 |

Fig. 8

DETECTION OF SIGNALS TRANSMITTED BY FREQUENCY-SHIFT KEYING MODULATION TECHNIQUES

FIELD OF THE INVENTION

The present invention generally relates to a wireless signal detection system and more particularly relates to a flexible search system for detecting a signal transmitted via a frequency-shift keying modulation technique.

BACKGROUND OF THE INVENTION

Frequency-shift keying (FSK) modulation is one form of modulation used to transmit information in wireless communication systems. In FSK modulation, the modulating signal shifts the output frequency between predetermined frequency values. For example, in binary FSK (or BFSK) two different frequencies may be used such that a transmission at one frequency indicates one symbol and a transmission at the other frequency indicates a second symbol.

In transmitting digital information, one symbol can represent a "1" and the other symbol can represent a "0." By shifting transmission between the various frequencies at the appropriate times, a sequence of information can be communicated. The actual symbol or symbols associated with the transmission at a given frequency need not, however, be a simple "1" or "0," but can be some other symbol or symbols as defined by the communication protocol being used.

M-ary FSK or MFSK is another related form of FSK modulation. In general, the M refers to the number of possible signals or tones that may be transmitted during each symbol period of $T_s$ seconds. As in the preceding BFSK example, the frequencies in the constellation are mapped to binary representations. In digital communication systems, it is most efficient if the number of tones in the constellation is equivalent to $M=2^k$, where k is any integer greater than or equal to 1 and, therefore, represents the number of bits that can be represented in the M-ary signal set. For BFSK, k is equal to 1, which is the number of bits that can be represented with each of the two transmitted tones.

One well-known form of 8-ary FSK modulation that is used in the high frequency (HF) band (3 MHz to 30 MHz) is MIL-STD-188-141A, which uses eight frequencies spaced 250 Hz apart. In this 8-ary waveform, $k=\log_2 (8)=3$. Therefore, the eight symbols (or tones in the constellation) represent all possible combinations of three bits. This waveform is used in systems that provide an automatic linking protocol between different transceivers. For this reason, it is commonly referred to as the Automatic Link Establishment (or ALE) waveform. Each transmitted tone has a duration, or period, of 8 milliseconds. The transmitted symbol rate is the reciprocal of the symbol period, which is 125 symbols per second. In the ALE waveform, each symbol represents a string of three bits, as shown in Table 1 below. The symbol indicated by each frequency is also shown in Table 1 (the frequency indicated is the frequency relative to the center frequency of the transmission):

TABLE 1

| Frequency | Symbol Indicated |
| --- | --- |
| 750 Hz | 000 |
| 1000 Hz | 001 |

TABLE 1-continued

| Frequency | Symbol Indicated |
| --- | --- |
| 1250 Hz | 011 |
| 1500 Hz | 010 |
| 1750 Hz | 110 |
| 2000 Hz | 111 |
| 2250 Hz | 101 |
| 2500 Hz | 100 |

In certain applications it is desired to determine whether a signal having certain known characteristics, such as an FSK signal, is being transmitted. In such circumstances it is necessary to search or scan the spectrum for the known characteristics. By way of example, an entity may wish to determine whether ALE signals having arbitrary channel designations are being transmitted. If it is determined that such a signal exists, then it is generally desirable that the signal be properly centered in the baseband spectrum so that the demodulator can properly demodulate the received tones. Improper channel alignment will prohibit the demodulator from properly demodulating and decoding the ALE signal.

In searching for the signal of interest, the receiver can scan (as in the case of HF, systems) in the upper side band (USB) or lower side band (LSB) of the current channel using an observation window. To search for an ALE signal, for example, the observation window should have a width of 3 kHz or more. The observation window used for the search, however, may have an alignment relative to the received signal such that only a subset of the received FSK tones fall within the scope of any observation window. The key to efficiently scanning the total range of frequencies of interest is to intelligently process the information available to the receiver. Current search methods, however, accomplish their objective by recording a very large segment of the spectrum and then analyzing the recording for:the presence of the signal pattern of interest. This type of search cannot be accomplished in real time. Other search methods incrementally scan the receiver in partial channel bandwidth increments, so as to "slide" the FSK signature into full view of the algorithm used to detect its presence. This is inefficient and does not take into account some of the characteristics present in typical M-ary FSK waveforms.

Consequently, there exists a need for an improved FSK search method and apparatus. A method and apparatus is needed that is capable of performing efficient, real time searches for FSK signals. Such a tool could be used by a participant in a communication network that is seeking another participant with which to communication. It can also be used, for example, by a receiving apparatus that is only interested in detecting and listening to certain FSK signals. These needs and others are fulfilled by the invention disclosed in the following detailed description.

SUMMARY OF THE INVENTION

It is an object of the present invention to provide a method and apparatus for detecting the presence of signals transmitted by frequency-shift keying modulation techniques It is a feature of the present invention to utilize a search technique capable of identifying a frequency-shift keyed signal even if only a portion of the signal is located within the search window, often due to an arbitrary channel designation, and then centering the detected signals for proper demodulation.

It is an advantage of the present invention to provide the capability of efficient real-time detection of signals transmitted via frequency-shift keying modulation techniques.

Thus, the present invention involves an apparatus and method for detecting a wirelessly communicated signal having certain known characteristics. It can be carried out in a "delay-less" manner in the sense that the search for such a signal be performed in real time. Further, the algorithm will make guesses as potential signatures are detected to further increase the efficiency of the scanning process. The invention can be used for detecting the presence of virtually any type of FSK signal. In one embodiment, for example, the invention can be used to detect the transmission of an ALE signal.

For example, when using a scanning radio to locate a FSK signal, arbitrary frequency offsets are possible and expected. The present invention provides an intelligent method for determining (possibly with limited information) the potential location of a FSK signature. Although the present invention is ideal for applications involving higher-order constellations, it is certainly not limited to such applications. Accordingly, the present invention is applicable to a wide range of FSK search applications.

BRIEF DESCRIPTION OF THE DRAWINGS

The invention may be more fully understood by reading the following description of the invention, in conjunction with the appended drawings wherein.

DETAILED DESCRIPTION

Various known wireless communication receivers and components can be used to perform the steps described throughout this specification. Such communication systems typically include a wireless transceiver or receiver component and a processing component. Also included in such systems is a memory system storing received data as well as programs for controlling data reception and for performing the functions described herein.

Figure 1:
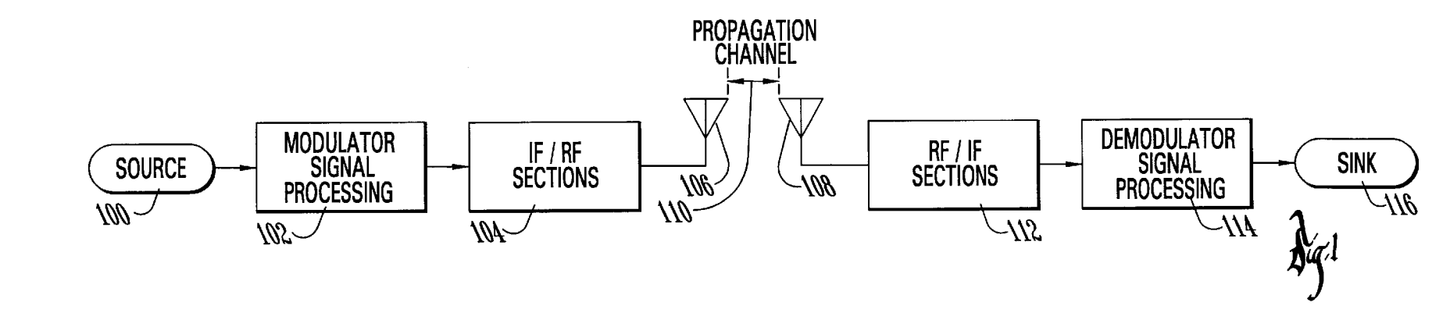
FIG. 1 is a block diagram of the basic structure of a wireless communication system.

FIG. 1 depicts a block diagram of a basic communication system. Data from a source 100 is fed to a modulator signal processing component 102 that in turn passes the modulated data to a wireless communication component 104. The communication signal is then transmitted by a transmitter antenna 106 to a receiver antenna 108. The link between the two antennas 106, 108 is known as the propagation channel 110. The receiver antenna 108 passes the received signal to the receiver's wireless communication component 112 that in turn sends the signal to a receiver-based demodulator signal processing component 114. The demodulated signal is then sent for further processing, handling or storage as represented by sink 116. Many of the receiver's functions can now be accomplished digitally. The present invention can be implemented by a wide variety of known receiver systems. Accordingly, it should not be limited to the structure of FIG. 1.

Figure 2:
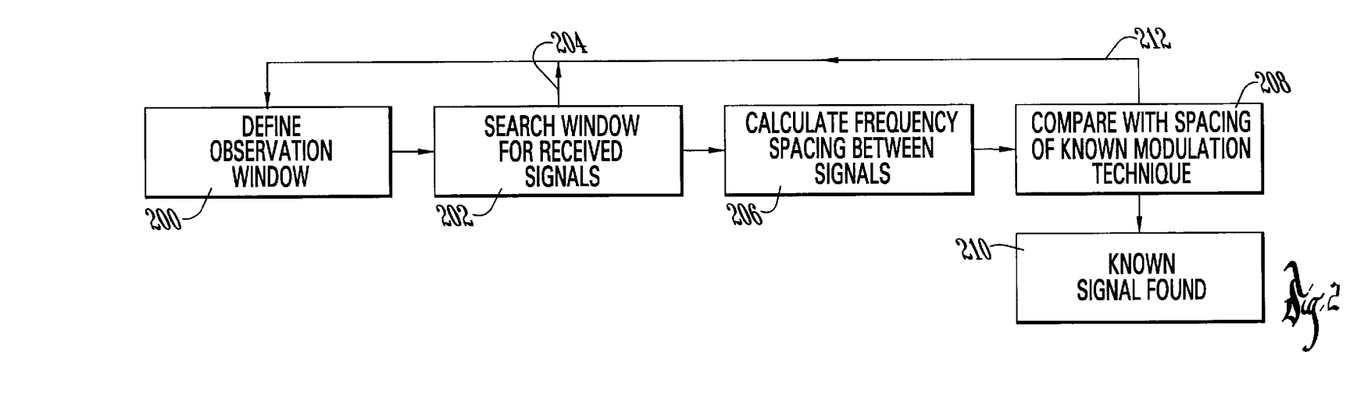
FIG. 2 is a flowchart showing steps involved in at least one embodiment of the present invention.

The steps performed by the present invention are summarized in FIG. 2. First, an observation window of a given frequency span is defined 200 within a portion of the frequency range to be searched. The defined observation window is then searched 202 to determine whether any of the possible received tones are present therein. If no tones are detected, a new observation window is defined 204. For example, a new window is set to span frequencies just higher than or just lower than the prior unsuccessful observation window. Alternatively, the new window can be set at a location not sharing a boundary with the prior window. The defining 200 and searching 202 steps are then repeated until signals are detected or until a default limit (for example a time or a frequency limit) is reached.

When two or more tones are detected within the observation window, the frequency spacing between the detected signals is calculated 206. The calculated frequency spacing is then compared with the spacing of one or more known FSK modulation techniques 208. The present invention can be designed to search for one known FSK modulation technique or to search for two or more different such modulation techniques simultaneously. In the embodiments where multiple FSK techniques are being sought, the comparison step will look for a match with any of multiple FSK techniques. If a match is found between at least one calculated spacing and at least one known spacing of a FSK technique, it is determined whether the current observation window must be shifted. The window need not be shifted if a complete known FSK frequency range is bounded within the current window. For example, if the known modulation technique being sought has four tones of a given frequency spacing and if four received tones having the same given spacing fall within the bounds of the window, then the search terminates and the signals within the observation window are read as they are received 210.

If, however, a frequency spacing match is found but all of the known or expected number of tones are not present within the window, the observation window can be shifted to encompass a frequency range that is either partially higher or partially lower than the frequency range of the current window 212. In the example of the previous paragraph, if only three of the four tones are found within the current window and if the two calculated frequency spacings falling between those three tones match the two spacings expected at one of the two ends of the known four tone pattern, the window can be shifted by redefining the observation window 200 and then searching 202 the redefined window to determine whether four tones are actually present. If the additional tones do not appear in the redefined window, a new observation window is defined 204 and the search continues.

If, however, at least four tones are present in the redefined window, then the frequency spacings between the received signals are calculated 206 and a comparison 208 is performed to determine whether there is a match. If the calculated spacing pattern does not match the known spacing pattern, the search continues 212. In such case, the calculated spacings are examined to determine whether a partial FSK pattern is possibly within the redefined window. If a partial pattern is detected, the window can be shifted by an amount appropriate to encompass any of the possibly missing tones, otherwise a completely new observation window can be defined. In either case, the search proceeds.

Figure 3:
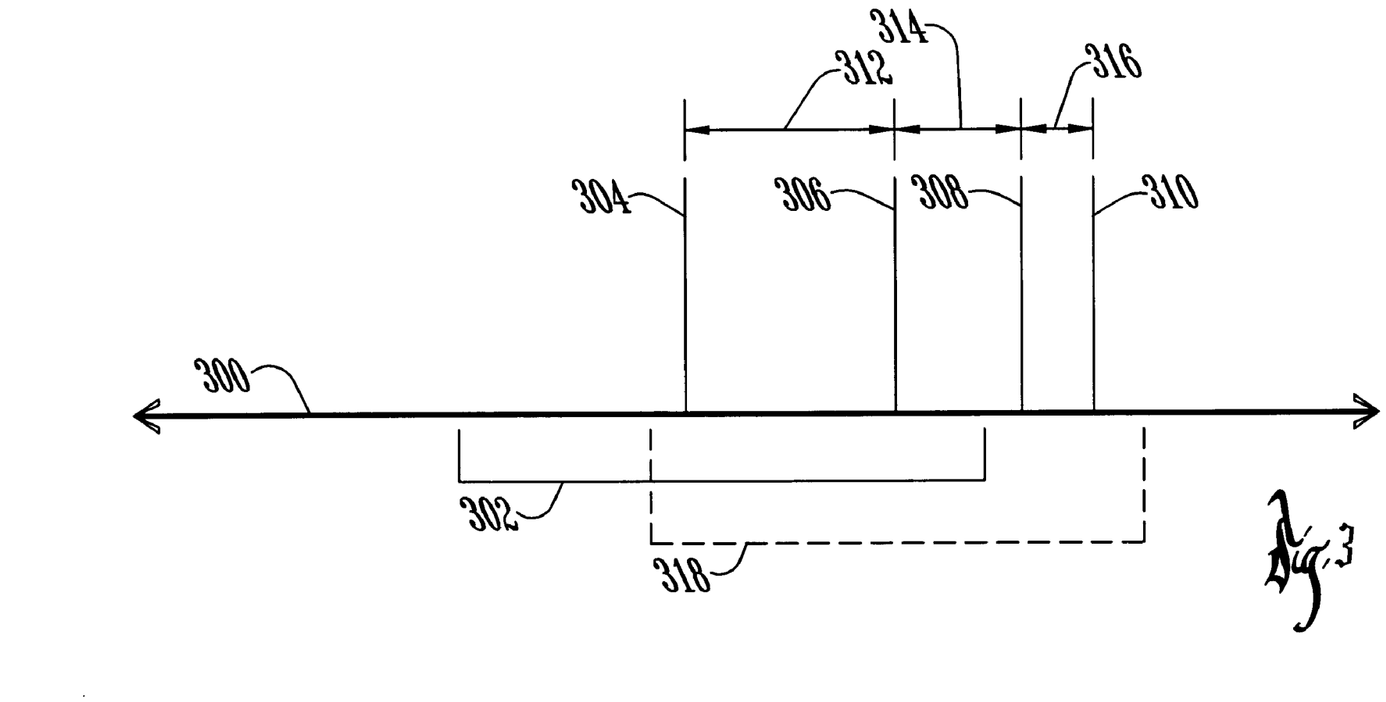
FIG. 3 depicts the use of an observation window to detect and center an FSK signal.

FIG. 3 depicts a portion of a frequency spectrum 300 and a defined observation window 302. In FIG. 3, the procedure described in relation to FIG. 2 is being applied to search for a FSK signal. During the time period that the observation window 302 is active, a communication is being transmitted via a four tone 304, 306, 308, 310 FSK modulation technique. In this example, the three frequency spacings 312, 314, 316 are of different sizes.

The present invention can be used with FSK modulation schemes using virtually any number of tones. In addition, the invention can be used with FSK schemes having regular spacing between tones (such as the ALE signal example) as well as with FSK schemes having irregular spacing (as in the example of FIG. 3). Further, the present invention can be used with FSK schemes wherein the tones are transmitted one at a time (such as is the case with the ALE signal example) and with FSK schemes wherein two or more tones are transmitted simultaneously. Thus, the examples depicted herein are illustrative only and are not intended to be limiting.

The observation window 302 encompasses two of the tones 304, 306 of the FSK transmission. The two tones will be discovered during the searching step 202, FIG. 2, and the frequency spacing 312 between them will be calculated 206, FIG. 2. The calculated spacing 312 will then be compared to the frequency spacings being used by any of the FSK transmission methods being sought 208, FIG. 2. A match with the lower frequency portion of the known four tone FSK pattern will be found during the comparison step. It will then be determined that the observation window must be shifted 212, FIG. 2, so that it can be determined whether the known four tone FSK technique is being used for a transmission. The amount of the shift is calculated and the observation window is redefined such that the missing higher frequency tones can be sought. The search 202, FIG. 2, is then repeated within the redefined observation window 318, FIG. 3. When the comparison step 208, FIG. 2, is performed, it will be determined that a transmission via the known four tone FSK modulation technique has been found. Thereupon, the receiving apparatus can proceed to receive the FSK transmission.

When the present invention is used in an HF, or similar, application, a particular sideband (USB or LSB) selection should be made. In such circumstances, the tones may be centered about the carrier frequency, for example. In HF, when an assumption is made that an FSK signal has been found, the radio is re-channeled accordingly. If another type of waveform having tones centered about a carrier is involved, then a similar re-channeling can be applied to that application. Time is saved and efficiency is improved by properly centering the signal for a modem, running in parallel with the algorithm, to begin establishing synchronization and demodulation of the tones. In the event the assumed signal is false, the modem will fail to acquire and the search will resume.

In one embodiment, the present invention is used to detect the presence of tones with 250 Hz spacing (ALE FSK tone spacing) anywhere within a given frequency band (for example, a 3 kHz band) by making a few assumptions about the waveform and applying some decision criteria. Alternatively, the receiver can scan at 8 kHz increments, which is commensurate with the baseband sample rate of the modem processing, or at some other appropriate increment. Based on the statistics of the channel, the embodiment determines whether a possible ALE signal is present. If an ALE-like signal appears to be present, a frequency shift value is computed and, based on the shift value, the receiver is re-channeled for either USB or LSB and the ALE demodulator is enabled. Further decisions are then made (based on the output of the correlators) as to whether the receiver should again be re-channeled for the opposite side-band for detection. The embodiment can be extended to an 8 kHz, or other size, search window. The only limiting factor is how large a block of samples can be processed in a timely manner. For example, in one embodiment a 256-point FFT is used to cover 8 kHz. Similarly, a 64 kHz step can be covered with a 2048-point FFT if that is representative of the baseband sample rate.

Figure 4:
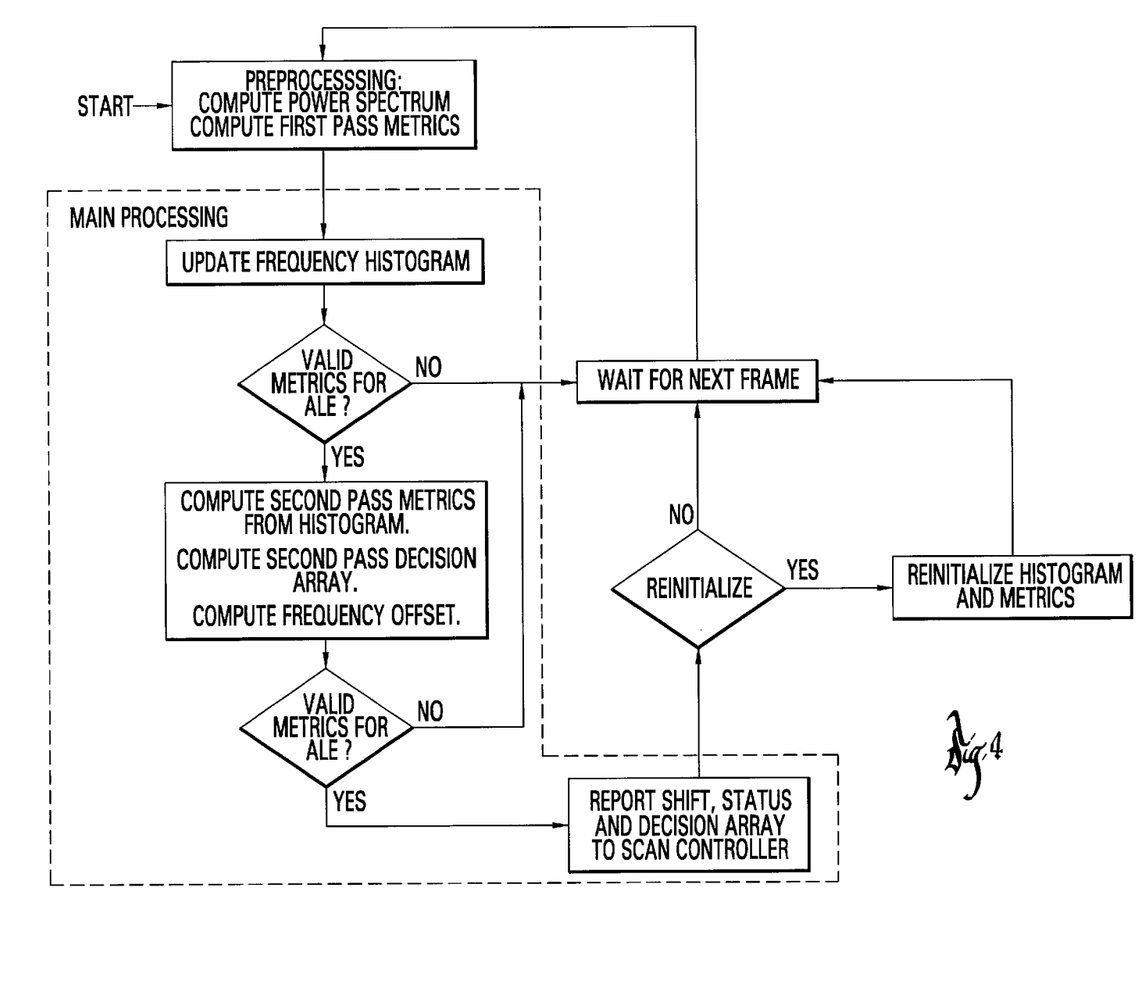
FIG. 4 is a top level diagram depicting the application of the present invention to a search for an ALE transmission.
Figure 5:
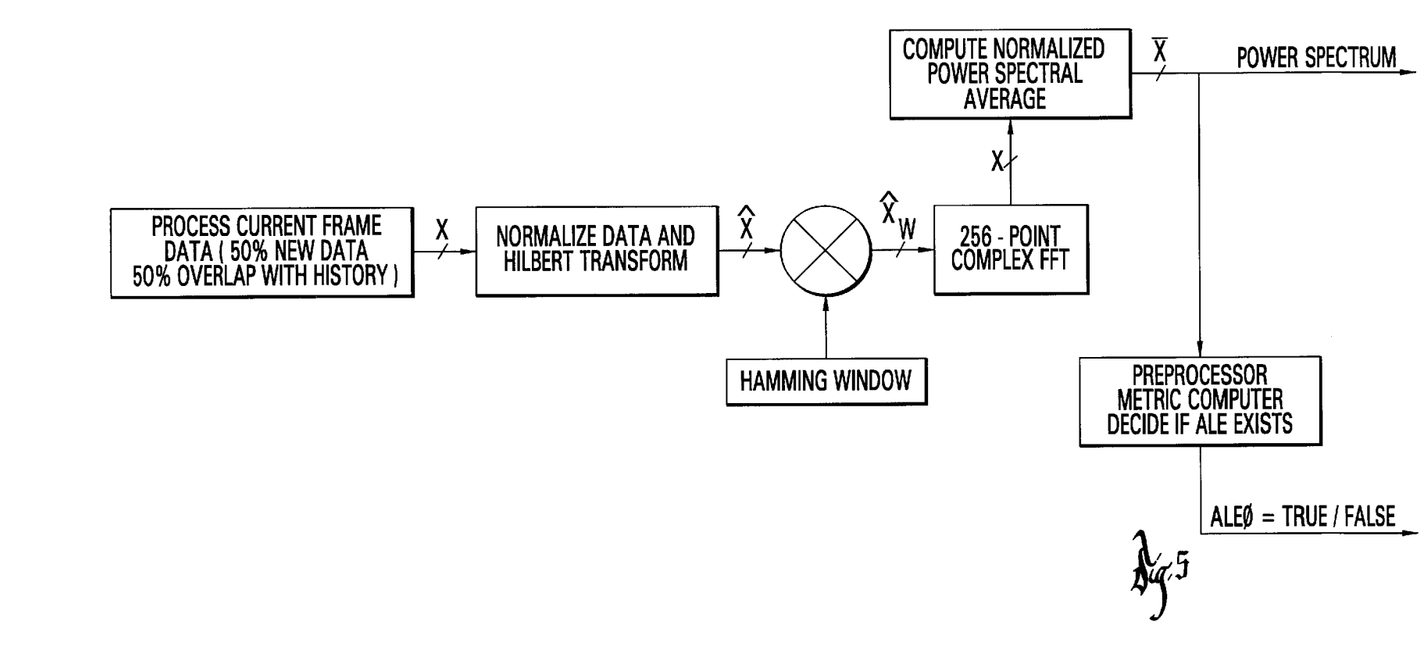
FIG. 5 depicts an embodiment of a preprocessor suitable for use with an embodiment of the present invention.

FIG. 4 is a top level diagram depicting the application of the present invention to a search for an ALE transmission. There are three basic elements in the design: a preprocessor, a main processor and a post processing section. The preprocessor, shown in greater detail in FIG. 5, computes a power spectral average using a single pole IIR filter. The data is normalized and windowed. A 256 Fast Fourier Transform (FFT) is computed and normalized to give the power spectral density of the signal.

Figure 6:
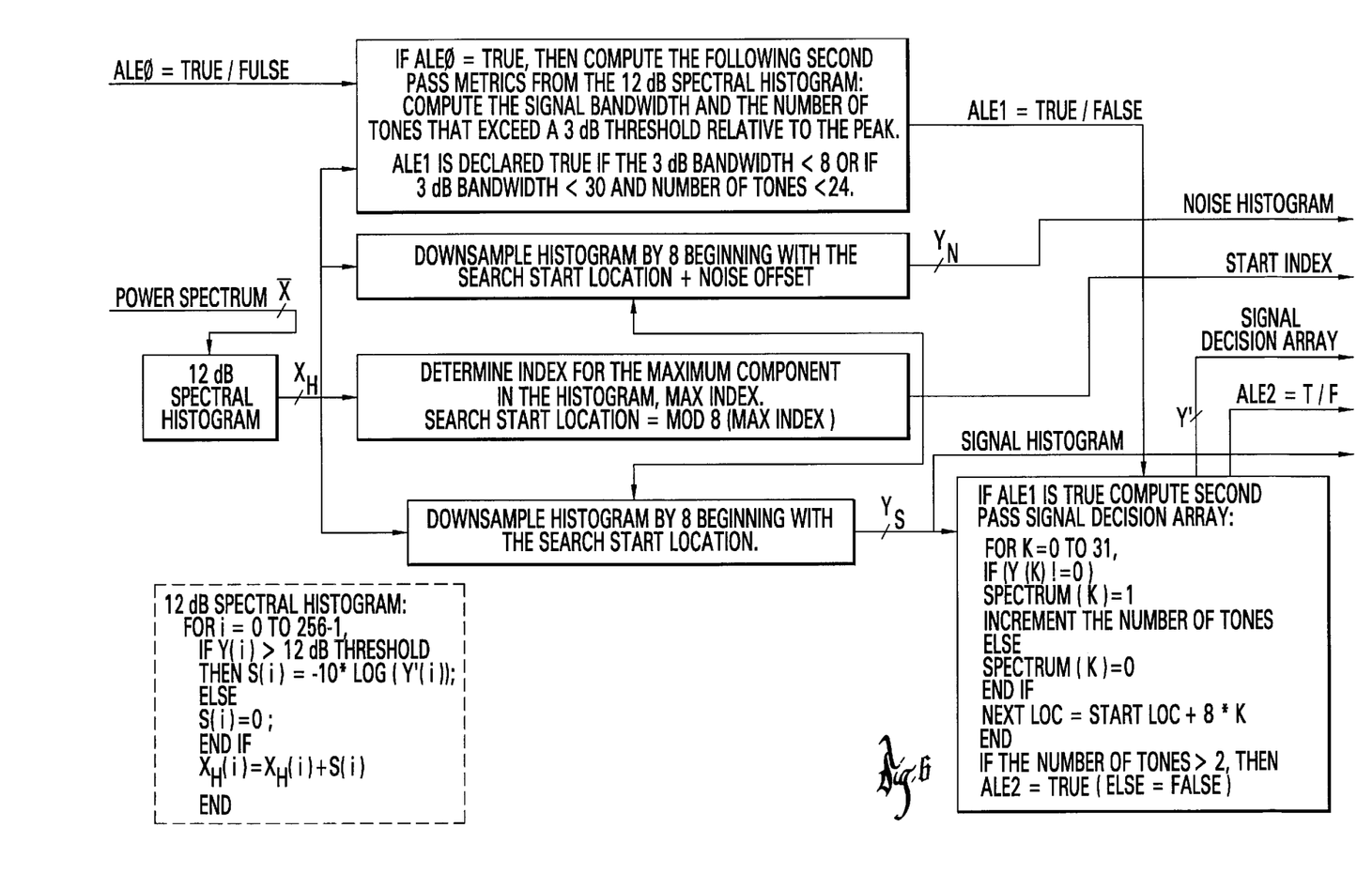
FIG. 6 depicts a portion of the processing involved in the ALE detection embodiment of the present invention.
Figure 7:
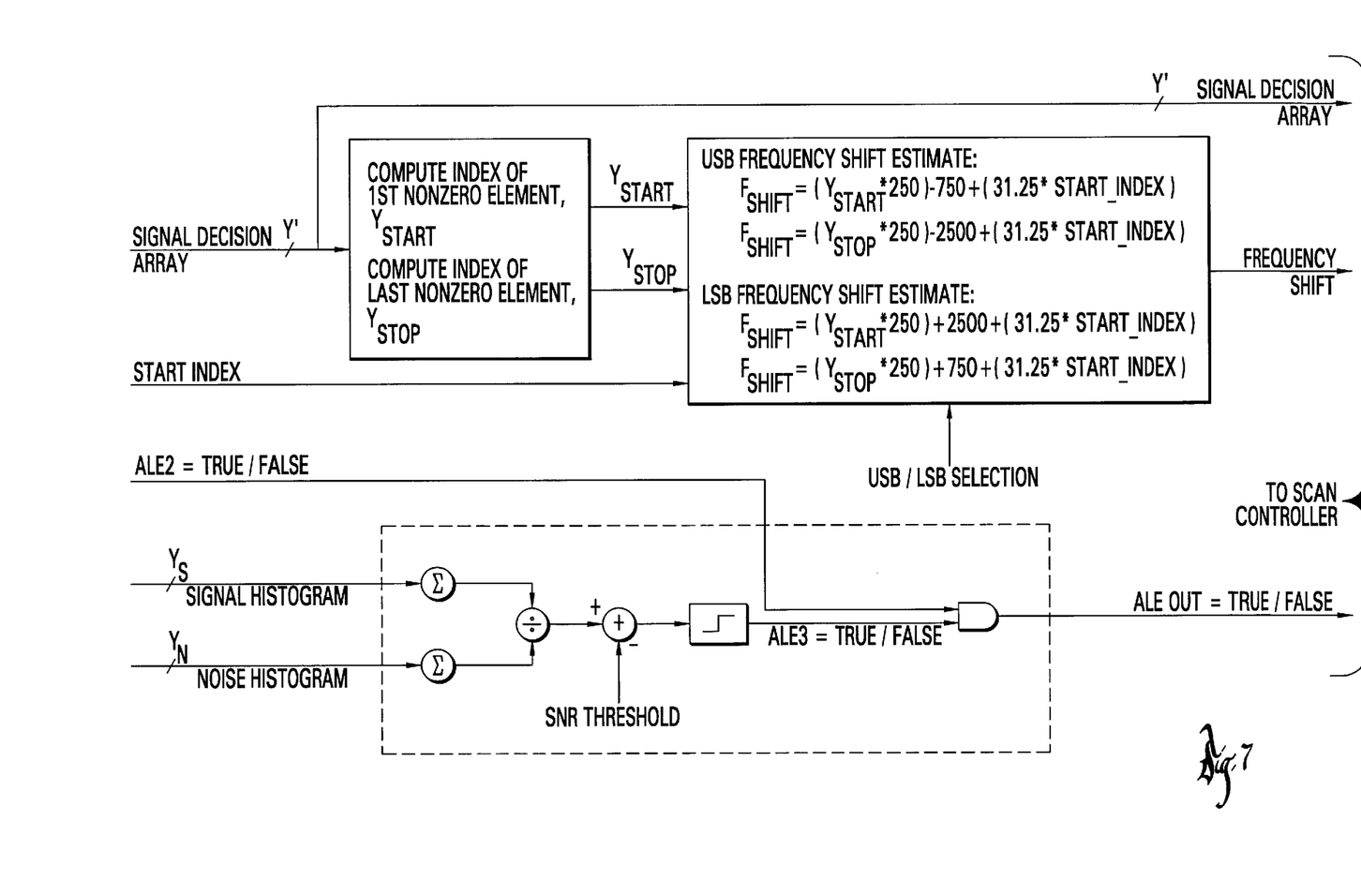
FIG. 7 depicts a continuation of the processing depicted in FIG. 6.

The main processing section, shown in greater detail in FIGS. 6 and 7, employs a specialized histogram. Metrics are computed from the histogram and, depending on the results, a frequency offset is calculated (as shown in FIG. 6). The calculated power spectral average is accumulated in the histogram. The maximum value of the histogram is then determined. In this embodiment, all values in the array below 12 dB of the maximum value are cleared. All values above 12 dB are converted to decibels.

The use of a 12 dB threshold is justified by the following argument. It is assumed that the algorithm is able to discriminate a signal that is received with an SNR of 0 dB with adequate detection margin. The signal-to-noise (SNR) ratio in a FFT's bandwidth at 0 dB SNR is given by:

$$SNR = 10\log\left(\frac{ENBW}{f_s/N}\right),$$

where ENBW is the Equivalent Noise BandWidth of the receiver, $f_s$ is the baseband sample rate and N is the order of the FFT. The ratio $f_s/N$ is also a measure of the resolution of the FFT. If the ENBW is equal to the baseband sample rate, then the equation reduces to a function of N only. If the measure is with respect to the bandwidth of a typical HF channel, then the ENBW is 3 kHz. It is assumed that the ENBW=$f_s$, and if a 128-point FFT is used, then the amount the signal appears above the noise floor is approximately 10*log(128)=24.1 dB. Thus, the amount of margin at 0 dB SNR is about 12 dB, which is adequate for much of the randomness of the potential signal at that SNR.

The histogram is then used to determine the bandwidth and the number of tones present in the channel. If the 3 dB bandwidth is less than 8 bins (for a low noise embodiment), where a "bin" is one of the outputs of the FFT (which in this example is 31.25 Hz), or if the number of tones is less than 24 and the 3 dB bandwidth is less than 30 bins (for a high noise embodiment), ALE1 is set to true and the maximum location in the array is determined. The starting location for the searching algorithm is the modulo-8 of the location of the maximum peak. From the starting location, every eighth bin (the 250 Hz regular frequency spacing for the ALE waveform) is examined to determine whether any signal energy is present. If energy exists in a particular location in the FFT array, a "1" is written in the decision array, otherwise a "0" is written in the position. Using the decision array, the frequency offset for shifting the observation window is calculated. Finally, if the number of tones is greater than two, and the SNR threshold is exceeded, then ALEout is set to true and the estimated shift value and the decision array are reported back to the communication control component.

Figure 8:
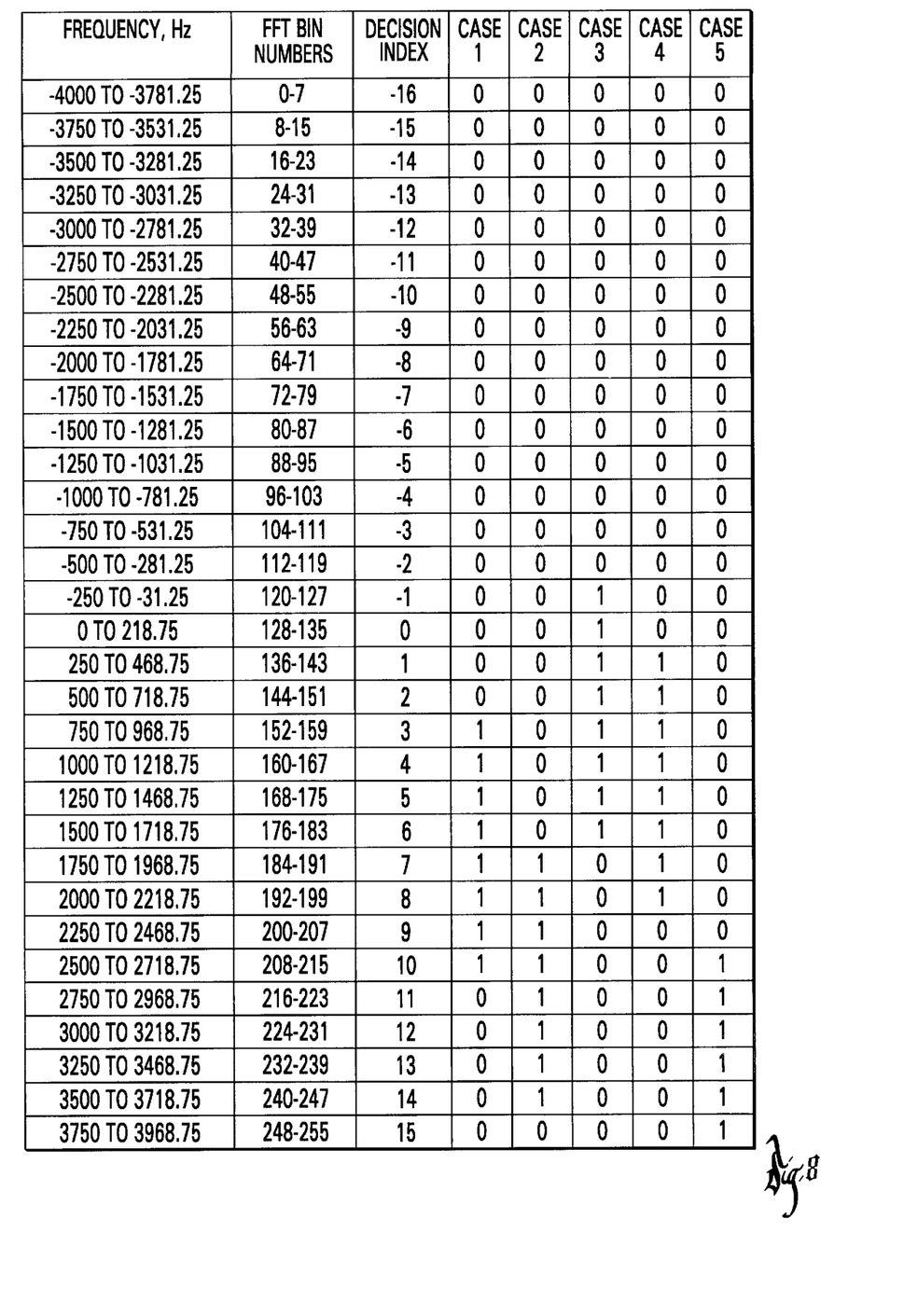
FIG. 8 is a table of a signal decision array for the ALE detection embodiment and five sample cases related thereto.

An example of the signal decision array, and five sample cases related thereto, is depicted in the table of FIG. 8. In Case 1, the ALE tones are perfectly centered on the channel. The first "1" is at bin number 3. This bin corresponds to 750 Hz. Since it is greater than or equal to 750 Hz, the estimated frequency shift is calculated to be 0 Hz.

In the example of Case 2, the ALE tones are off-center by 1000 Hz. The first "1" is at bin number 7. This bin corresponds to 1750 Hz. Since it is greater than or equal to 750 Hz, the estimated frequency shift is calculated to be −1000 Hz.

The ALE tones are off-center by −1000 Hz in Case 3. The first "1" is at bin number −1. This bin corresponds to −250 Hz. Since it is less than 750 Hz, after determining that the last "1" is at bin number 6 (which corresponds to 1500 Hz), the estimated frequency shift is calculated to be 1000 Hz.

In Case 4, the ALE tones are off-center by −500 Hz. The first "1" is at bin number 1. This bin corresponds to 250 Hz. Since it is less than 750 Hz, after determining that the last "1" is at bin number 8 (which corresponds to 2000 Hz), the estimated frequency shift is calculated to be 500 Hz.

Finally, in Case 5, the ALE tones are off-center by 1750 Hz and two tones that are out of band are missing. The first "1" is at bin number 10. This bin corresponds to 2500 Hz. Since it is greater than or equal to 750 Hz, the estimated frequency shift is calculated to be −1750 Hz. Although Case 5 is severely off-center and some of the tones are out-of-band, the ALE signal can still be detected and a report to change the frequency by 1750 Hz can be sent to the scan controller to re-channel the radio to attempt to receive the potential signal. The first four cases can be handled in a similar manner or the algorithm can provide the offset to the modem receiver, where the ALE modem can compensate for the offset. It will be appreciated that the description provided via FIGS. 4 through 8, as well as the description relative to FIGS. 1 through 3, can be modified and applied to many variations, and can thus be used for detecting many different types of FSK transmissions.

It is thought that the present invention will be understood from the description provided throughout this specification and the appended claims, and that it will be apparent that various changes may be made in the form, construct steps and arrangement of the parts and steps thereof, without departing from the spirit and scope of the invention or sacrificing all of their material advantages. The forms herein described are merely exemplary embodiments thereof.

What is claimed is:

1. A method of detecting a wireless communication signal, comprising the steps of:
    defining an observation window encompassing a frequency band;
    searching the defined observation window for received tones;
    calculating a frequency spacing between at least two received tones found in said searching step; and
    comparing the calculated frequency spacing with a frequency spacing scheme of a known modulation technique to determine whether the at least two received tones are at least a portion of a transmission made via the known modulation technique.

2. The method of claim 1, further comprising the step of shifting the defined observation window such that, if the at least two received tones are actually a portion of the transmission made via the known modulation technique, the shifted observation window will include additional tones being transmitted via the known modulation technique.

3. The method of claim 2, wherein said shifting step extrapolates a correct shift in frequency to properly center a potential signal, when the at least two received tones and the additional tones are of the known modulation technique, for parallel modem processing that will attempt to demodulate and decode the potential signal.

4. The method of claim 1, further comprising the step of shifting the defined observation window such that, if the at least two received tones are actually a portion of the transmission made via the known modulation technique, the shifted observation window will include all frequencies being transmitted via the known modulation technique.

5. The method of claim 4, further comprising the step of analyzing signals within the shifted observation window to determine whether a transmission being made via the known modulation technique has been detected.

6. The method of claim 1, wherein the known modulation technique is a frequency-shift keying modulation technique signaling on at least two frequencies.

7. The method of claim 6, wherein the frequency-shift keying modulation technique signaling on at least two frequencies is a high frequency range signal.

8. The method of claim 1, wherein the known modulation technique comprises tones centered about a carrier frequency.

9. The method of claim 8, further comprising the step of selecting a sideband within which to define the observation window.

10. The method of claim 9, further comprising the step of shifting the defined observation window into the selected sideband such that, if the at least two received tones are actually a portion of the transmission made via the known modulation technique, the shifted observation window will include additional tones being transmitted via the known modulation technique.

11. The method of claim 1, wherein the known modulation technique is an automatic link establishment waveform.

12. The method of claim 11, wherein the observation window has an 8 kHz bandwidth and where said search step computes a 256 point Fast Fourier Transform.

13. A communication apparatus capable of detecting a transmission made via a frequency-shift keying modulation technique, comprising:
    a signal receiving component;
    a memory system storing data representing signals received by said signal receiving component, said memory system also storing instructions for defining an observation window encompassing a frequency band, for searching the defined observation window for received tones; for calculating a frequency spacing between at least two received tones found within the defined observation window, and for comparing the calculated frequency spacing with a frequency spacing scheme of a known modulation technique to determine whether the at least two received tones are at least a portion of a transmission made via the known modulation technique; and
    a processing component, coupled with said signal receiving component, and with said memory system, said processing component being capable of executing the instructions for defining an observation window encompassing a frequency band, for searching the defined observation window for received tones; for calculating a frequency spacing between at least two received tones found within the defined observation window, and the instructions for comparing the calculated frequency spacing with a frequency spacing scheme of a known modulation technique to determine whether the at least two received tones are at least a portion of a transmission made via the known modulation technique.

14. The method of claim 13, wherein said memory system also stores instructions for shifting the defined observation window such that, if the at least two received tones are actually a portion of the transmission made via the known modulation technique, the shifted observation window will include additional frequencies being transmitted via the known modulation technique, and wherein said processing component is also capable of executing the instructions for shifting the defined observation window.

15. The method of claim 14, wherein said memory system also stores instructions for properly centering the at least two received tones and the additional frequencies being transmitted for parallel modem processing that will attempt to demodulate and decode the potential signal, and wherein said processing component is also capable of executing the instructions for properly centering.

16. The communication apparatus of claim 13, wherein said memory system stores the data representing tones received by said signal receiving component in a histogram.

17. The communication apparatus of claim 13, wherein the instructions stored in said memory system are capable of detecting an automatic link establishment transmission.

18. A communication apparatus capable of receiving a signal via a dispersive media, comprising:

means for receiving a signal;

means for storing information, storing information representing a signal received by said means for receiving, said means for storing information also being for storing instructions for searching a defined observation window for received tones and for determining whether received tones have been transmitted via a frequency-shift keying modulation technique; and means for processing, coupled with said means for receiving, and also coupled with said means for storing, said means for processing being capable of executing the instructions for searching a defined observation window for received tones and for determining whether received tones have been transmitted via a frequency-shift keying modulation technique.

19. The communication apparatus according to claim 18, wherein said means for storing also stores instructions for shifting the defined observation window to encompass additional tones potentially transmitted via a frequency-shift keying modulation technique, and wherein said means for processing is also capable of executing the instructions for shifting the defined observation window.

20. The communication apparatus according to claim 18, wherein said means for storing stores instructions for properly centering the at least two received tones, and any additional frequencies being transmitted, for parallel modem processing that will attempt to demodulate and decode a potential signal, and wherein said processing component is also capable of executing the instructions for properly centering the potential signal.

* * * * *